US008648995B2

(12) United States Patent
Katsura

(10) Patent No.: US 8,648,995 B2
(45) Date of Patent: Feb. 11, 2014

(54) LIQUID CRYSTAL DISPLAY DEVICE AND MANUFACTURING METHOD THEREOF

(75) Inventor: Hideki Katsura, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 570 days.

(21) Appl. No.: 12/721,771

(22) Filed: Mar. 11, 2010

(65) Prior Publication Data

US 2010/0165283 A1    Jul. 1, 2010

Related U.S. Application Data

(62) Division of application No. 11/028,447, filed on Jan. 4, 2005, now Pat. No. 7,679,710, which is a division of application No. 09/753,318, filed on Dec. 28, 2000, now Pat. No. 6,844,910.

(30) Foreign Application Priority Data

Dec. 28, 1999   (JP) .................................. 11-372087

(51) Int. Cl.
*G02F 1/1339* (2006.01)
*G02F 1/1341* (2006.01)

(52) U.S. Cl.
USPC ............................ 349/189; 349/153; 349/154

(58) Field of Classification Search
USPC .................................. 349/153–154, 189–19
See application file for complete search history.

(56) References Cited

U.S. PATENT DOCUMENTS

| | | |
|---|---|---|
| 4,094,058 A | 6/1978 | Yasutake et al. |
| 4,526,818 A | 7/1985 | Hoshikawa et al. |
| 4,548,475 A | 10/1985 | Brendle et al. |
| 4,820,025 A | 4/1989 | Nakanowatari |
| 5,080,146 A | 1/1992 | Arasteh |
| 5,184,239 A | 2/1993 | Sano et al. |
| 5,276,541 A | 1/1994 | Terada et al. |
| 5,359,442 A | 10/1994 | Tanaka et al. |
| 5,454,893 A | 10/1995 | Dietz |
| 5,459,597 A | 10/1995 | Yamamoto et al. |
| 5,477,361 A | 12/1995 | Yanagi |
| 5,492,582 A | 2/1996 | Ide et al. |
| 5,598,286 A | 1/1997 | Yanagi |
| 5,706,069 A | 1/1998 | Hermens et al. |
| 5,725,032 A | 3/1998 | Oshima et al. |
| 5,815,231 A | 9/1998 | Nishi et al. |
| 5,943,107 A | 8/1999 | Kadota et al. |
| 5,946,070 A | 8/1999 | Kohama et al. |
| 6,001,277 A | 12/1999 | Ichimura et al. |
| 6,099,672 A | 8/2000 | Yamazaki et al. |

FOREIGN PATENT DOCUMENTS

| | | |
|---|---|---|
| EP | 0 742 471 A2 | 11/1996 |
| EP | 867750 A2 | 9/1998 |
| JP | 56102517 A | 8/1981 |
| JP | 59186826 A | 12/1984 |

(Continued)

*Primary Examiner* — James Dudek
(74) *Attorney, Agent, or Firm* — Fish & Richardson P.C.

(57) ABSTRACT

Relating to a method of manufacturing a liquid crystal display device, minimizing liquid crystal material loss and use of cleaning solvent, and providing a liquid crystal display device in which a seal pattern having few gap inconsistencies are taken as a objective. Liquid crystal material wraparound can be prevented by forming a seal stopper portion outside a peripheral seal portion, and in addition, by increasing the degree of symmetry of the seal pattern and by forming a damming portion between injection ports, gap inconsistencies within the liquid crystal display device can be reduced.

15 Claims, 31 Drawing Sheets

(56) References Cited

FOREIGN PATENT DOCUMENTS

| | | |
|---|---|---|
| JP | 61-217018 A | 9/1986 |
| JP | 64009423 U | 1/1989 |
| JP | 01-152421 A | 6/1989 |
| JP | 2064523 A | 3/1990 |
| JP | 2127613 A | 5/1990 |
| JP | 05011260 A * | 1/1993 |
| JP | 05-088190 A | 4/1993 |
| JP | 5173150 A | 7/1993 |
| JP | 5241169 A | 9/1993 |
| JP | 406082800 A | 3/1994 |
| JP | 406095132 A | 4/1994 |
| JP | 6244103 A | 9/1994 |
| JP | 6244104 A | 9/1994 |
| JP | 6265013 A | 9/1994 |
| JP | 6265913 A | 9/1994 |
| JP | 6273778 A | 9/1994 |
| JP | 6273779 A | 9/1994 |
| JP | 06-317805 A | 11/1994 |
| JP | 7092475 B | 4/1995 |
| JP | 07-140474 A | 6/1995 |
| JP | 07-235386 A | 9/1995 |
| JP | 8095069 A | 4/1996 |
| JP | 8507622 A | 8/1996 |
| JP | 8201821 A | 9/1996 |
| JP | 08-304828 A | 11/1996 |
| JP | 08-328005 A | 12/1996 |
| JP | 9090380 A | 4/1997 |
| JP | 9197416 A | 7/1997 |
| JP | 9230357 A | 9/1997 |
| JP | 9258240 A | 10/1997 |
| JP | 10333161 A | 12/1998 |
| JP | 10333165 A | 12/1998 |
| JP | 11052398 A | 2/1999 |
| WO | WO9519587 A1 | 7/1995 |

* cited by examiner

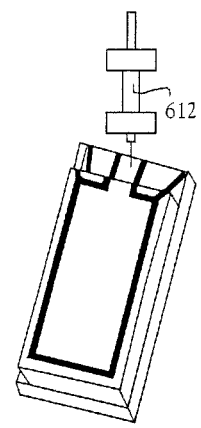
FIG. 6A
 
FIG. 6B          FIG. 6C

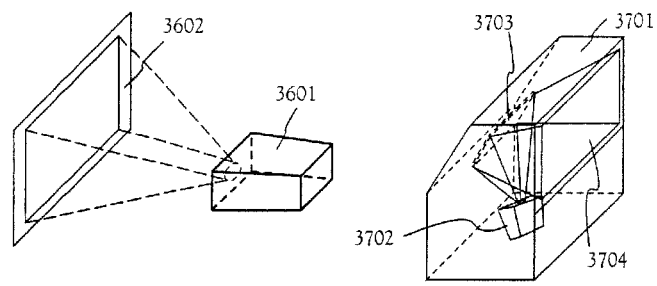
FIG. 30A
FIG. 30B
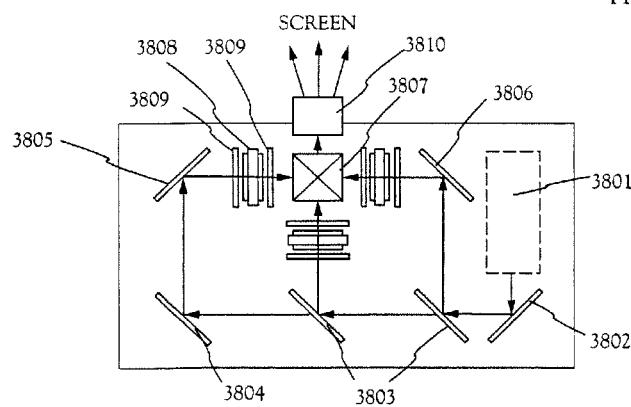
FIG. 30C
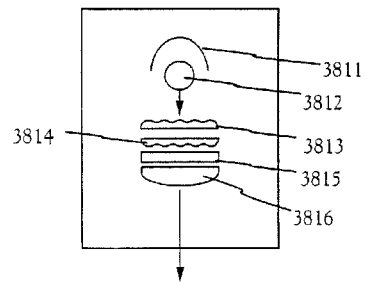
FIG. 30D

LIQUID CRYSTAL DISPLAY DEVICE AND MANUFACTURING METHOD THEREOF

CROSS-REFERENCE TO RELATED APPLICATIONS

This application is a continuation of U.S. application Ser. No. 11/028,447, filed Jan. 4, 2005, now allowed, which is a divisional of U.S. application Ser. No. 09/753,318, filed Dec. 28, 2000, now U.S. Pat. No. 6,844,910, which claims the benefit of a foreign priority application filed in Japan as Serial No. 11-372087 on Dec. 28, 1999, all of which are incorporated by reference.

BACKGROUND OF THE INVENTION

1. Field of the Invention

The present invention relates to a structure of a liquid crystal display device using a method of injecting a liquid crystal material by a vacuum injection method and a dripping injection method into the liquid crystal display device sandwiched between opposing substrates. In addition, the present invention relates to a technique for increasing productivity of a liquid crystal display device, and in particular, the present invention relates to a separating method for a multiple panel.

2. Description of the Related Art

Advances in making recent liquid crystal display devices large in size have come about with their expanding use as display devices such as notebook computers and personal computer workstations.

A seal pattern used for bonding a pair of substrates having electrodes, at least one of which is transparent, has the greater portion of the seal pattern swept along the end face of a substrate, as shown in FIG. 1 and FIG. 2.

FIG. 1 shows an element substrate 101, an opposing substrate 102, a display pixel portion 105, a peripheral driver circuit 106, an external lead-out wiring portion 107, a peripheral seal portion 103 so as to surround the display pixel portion 105 and the peripheral driver circuit 106, an injection port 104, and a sealing resin 111.

FIG. 2 shows an element substrate 201, an opposing substrate 202, a display pixel portion 205, a peripheral driver circuit 206, an external lead-out wiring portion 207, a peripheral seal portion 203 so as to surround the display pixel portion 205 and the peripheral driver circuit 206, an injection port 204, and a sealing resin 211.

When performing liquid crystal injection to this type of conventional liquid crystal display device (this type of liquid crystal display device is hereafter generically referred to as a liquid crystal display device A), the liquid crystal material wraps around the outside of the seal pattern, and loss of liquid crystal material develops. Considering that the cost of a TN liquid crystal is several thousand yen per gram, and the cost of an anti-ferroelectric liquid crystal is several tens of thousand yen per gram, reducing the loss of the liquid crystal material in order to enlarge the liquid crystal panel size and to perform mass production is urgent.

Further, in order to remove liquid crystal material adhering to the liquid crystal display device, an excess of cleaning solvent is necessary, and this has problems in production. In particular, the removal of the liquid crystal material which permeates the narrow gap and wraps around the outside of the closed seal pattern, as with a liquid crystal display device using a ferroelectric liquid crystal or an anti-ferroelectric liquid crystal, is difficult, and therefore the wave motion of ultrasonic waves is employed. However, when irradiating ultrasonic waves, fatal faults such as spacers moving due to a reduction in package strength, and the gap between substrates becoming non-uniform, are brought about.

In addition, in order to realize a lowering of costs, it is necessary to increase the number of liquid crystal panels manufactured from a pair of substrates having electrodes, at least one of which is transparent, namely it is necessary to increase the number which can be removed. A region on the outside of a liquid crystal display device on a substrate having electrodes becomes narrow, and a region capable of forming a dummy seal pattern (indicating, throughout this specification, a seal pattern other than a seal pattern formed so as to surround a display pixel portion and a peripheral driver circuit in order to confine the liquid crystal) becomes narrow, and a goal of stopping seal pealing cannot be sufficiently achieved.

Furthermore, when the dummy seal is not applied sufficiently, a reverse break develops during a separating process during manufacturing, and this has problems such as inviting a reduction in throughput. (When scribing, a cut line is first formed as a separating portion, and by breaking the substrate on the opposite side as the abrasion is formed, the cut line becomes a deep groove, and a scribe line is formed. However, during breaking, the substrate opposite to the substrate on which the cut line has been put is overloaded, and sometimes this substrate breaks. This type of break is indicated by the term reverse break throughout this specification.)

In order to inject a highly viscous ferroelectric liquid crystal or anti-ferroelectric liquid crystal in a short period of time, a case of using a previously proposed liquid crystal display device having a seal pattern possessing a plurality of injection ports has problems such as inviting a reduction in reliability by such factors as resistance to moisture.

SUMMARY OF THE INVENTION

In order to solve these problems, an object of the present invention is to provide a liquid crystal display device having few gap inconsistencies, and a method of manufacturing the same.

In order to solve the above problems, a liquid crystal display device of the present invention is a liquid crystal display device in which a pair of substrates having electrodes, at least one of which is transparent, are opposed on the electrode sides of the substrates, and overlapped by a sealing material (hereafter referred to as a seal stopper portion) having a conventional seal pattern portion and a joining portion between the corners of the seal pattern and the edge surfaces of the substrate, forming an empty liquid crystal display device having a gap between the substrates. A liquid crystal material is injected through an open portion (injection port) of the seal portion in the empty liquid crystal display device. A liquid crystal display device having this type of basic seal pattern is referred to generically as a liquid crystal display device B throughout this specification.

In order to solve the above problems, a liquid crystal display device of the present invention is a liquid crystal display device in which an empty liquid crystal display device is formed having a pair of substrates having electrodes, at least one of which is transparent, with the electrode sides of the substrates opposing, a sealing material overlapping, and a gap between the substrates, into which a liquid crystal material is injected, characterized in that an open portion (injection port) in a sealing portion of the display device is formed in a corner of the substrates. A liquid crystal display device having this type of basic seal pattern is referred to generically as a liquid crystal display device C throughout this specification. The sealing portion formed in the open portion of the liquid crystal display device C fulfills a role as both a seal stopper portion of a liquid crystal display device B and an injection port.

It is preferable to increase the degree of symmetry of the seal pattern of the outside of a conventional sealing portion, namely the seal stopper portion, in the liquid crystal display device including the seal stopper portion.

It is preferable to implement a damming portion composed of the sealing material in the liquid crystal display device including the seal stopper portion and the liquid crystal display device having the injection port in the corner of the substrates. Note that there is no particular limitation on the formation of the damming portion.

The above stated problem in using a vacuum injection method or a dripping injection method in a liquid crystal display device in which a seal pattern is formed is thus solved by the structure of the present invention.

A method of manufacturing a liquid crystal display device, a display device in which a pair of substrates having electrodes, at least one of which is transparent, are placed so that the electrode sides of the substrates are opposed, and a sealing material is formed in a gap between the substrates, and in which a seal stopper portion is formed external to the seal pattern so that a liquid crystal material does not wrap around, is characterized in that an open portion (injection port) is formed in one side of the seal portion of the display device, or in that the open portion of the seal portion of the display device is arranged in a corner of the substrates, and in that the open portion (injection port) of the open display device is immersed in a liquid crystal in a vacuum container, and by subsequently leaking and returning to atmospheric pressure, the liquid crystal material is injected, and in that the liquid crystal material is supplied continuously and so as not to run out until the injection is completed.

Further, a method of manufacturing a liquid crystal display device is characterized in that a gap is formed by a sealing material between a pair of substrates having electrodes, at least one of which is transparent, which have their electrode sides of the substrates opposed, a seal stopper portion is formed so that a liquid crystal material does not wrap around a portion external to a seal pattern, an open portion (injection port) is formed in one side of the sealing portion or the open portion of the seal (injection port) is arranged in a corner of the substrates, the open portions (injection ports) are maintained in an upward facing direction state under a reduced pressure within a vacuum chamber and then a necessary amount of a liquid crystal material is injected into the injection port under atmospheric pressure or under a pressurized environment using a dispenser for dripping a liquid crystal which is filled with the liquid crystal material and is arranged within the vacuum chamber, and the liquid crystal is continuously supplied so as not to run out until the injection is completed.

When two glass substrates are divided unevenly, that is, only one of the substrates is removed, a step is formed. The region where the step is generated is defined as an offset region. A liquid crystal display device in which the offset portion is formed near the injection port is preferable.

When using a ferroelectric liquid crystal or an anti-ferroelectric liquid crystal material as the liquid crystal material, it may be injected into the liquid crystal display device in a state in which it has undergone a phase transformation from a gel state to a liquid state.

Normally, in order to perform a rubbing process in a method of manufacturing a device, injection ports formed in overlapping substrates before a conventional separating process are faced in the same direction in a multiple panel, as shown in FIG. 26. In this specification, a substrate having a seal pattern as shown in FIG. 27 is designed, and a uniform pre-tilt angle is obtained over a large screen surface, and an optical orientation process is used as a technique having superior productivity. As shown in FIG. 27, an orientation film is applied (not shown in the figure) for use in optical orientation, and a hole portion (within a dotted line 1) is formed in the orientation film as an offset portion in an element substrate or an opposing substrate, and an optical orientation process is performed. In the offset portion, one of the element and opposing substrates is removed. Therefore, a step of formed in the offset portion.

A sealing material having a pattern of the present invention is then applied. The element substrate and the opposing substrate are overlapped, and thermal pressing is performed. In addition, dripping injection of the liquid crystal material is performed in the hole portion (within the dotted line 1), and the hole portion is cleaned by an organic solvent material after injection is completed. By later performing separating (dotted lines 2, 3, and 4) closure, the multiple panel is completed. The liquid crystal display device of the present invention can be an active matrix type display device. Also, in the active matrix display device, a plurality of thin film transistors can be formed as switching elements in a pixel portion. Further, the liquid crystal display device of the present invention can have a plurality of thin film transistors in a peripheral driving circuit portion thereof.

An aspect of the present invention is characterized in a liquid crystal display device comprising a pair of substrates, at least one of the substrates being transparent; a liquid crystal layer interposed between the pair of substrate; a sealing material being formed in an outside portion of the liquid crystal layer and being formed between the pair of substrates; a peripheral seal portion being formed in an inside portion of end portions of the pair of substrates; an open portion for injecting a liquid crystal material being formed in a side of the sealing material; at least a seal stopper portion being formed in both end portions of the side, wherein the seal stopper portion extends from the sealing material to an end portion of the pair of substrates opposing the liquid crystal layer.

In the liquid crystal display device, a plurality of seal stopper portions are formed in parallel from the seal stopper portion with respect to a side of the open portion.

In the liquid crystal display device, a plurality of seal stopper portions are formed in an opposite side of the open portion.

In the liquid crystal display device, a seal stopper portion is formed in an outside portion of the peripheral seal portion and on an axis of symmetry of the substrates.

In the liquid crystal display device, a damming portion is formed in the open portion.

Another aspect of the-present invention is characterized in a liquid crystal display device comprising a pair of substrates having different sizes, at least one of the substrates being transparent; a liquid crystal layer interposed between the pair of substrate; a sealing material being formed in an outside portion of the liquid crystal layer and being formed between the pair of substrates; a peripheral seal portion being formed in an inside portion of end portions of the pair of substrates; an open portion for injecting a liquid crystal material being formed in a side of the sealing material; at least a seal stopper portion being formed in both end portions of the side, wherein the seal stopper portion extends from the sealing material to a corner of the pair of substrates opposing the liquid crystal layer.

Another aspect of the present invention is characterized in a liquid crystal display device comprising a pair of substrates, at least one of the substrates being transparent; a liquid crystal layer interposed between the pair of substrate; a sealing material being formed in an outside portion of the liquid crystal layer and being formed between the pair of substrates; a peripheral seal portion being formed in an inside portion of end portions of the pair of substrates; an open portion for injecting a liquid crystal material being formed in a corner of the sealing material.

In the liquid crystal display device, a plurality of seal stopper portions are formed in an outside portion of the open portion.

In the liquid crystal display device, a plurality of seal stopper portions are formed in an opposite corner of the open portion.

In the liquid crystal display device, a plurality of seal stopper portions are formed in an outside portion of the peripheral seal portion, and the plurality of seal stopper portions are formed in two corners other than the open portion and an opposite corner of the open portion.

In the liquid crystal display device, a seal stopper portion is formed in an outside portion of the peripheral seal portion and on an axis of symmetry of the substrates.

In the liquid crystal display device, a damming portion is formed in the open portion.

A method of manufacturing the liquid crystal display device, comprises the steps of forming an orientation film over each of an element substrate and an opposing substrate; performing an orientation process to each of the element and opposing substrates; forming the sealing material on one of the element and opposing substrates; joining the element and opposing substrates; separating the joined element and opposing substrates to form at least an empty liquid crystal display device; injecting the liquid crystal material into the empty liquid crystal display device through an immersion method, wherein a V-shape liquid crystal dish being possible of contacting the open portion formed in the corner of the empty liquid crystal display device is used in the injection step.

Another aspect of the present invention is characterized in a method of manufacturing a liquid crystal display device, the method comprising the steps of preparing an element substrate and an opposing substrate, one of the element and opposing substrates having a hole portion being possible of injecting a liquid crystal material; forming an orientation film over each of the element and the opposing substrates; performing an orientation film to each of the element and opposing substrates; forming a sealing material on one of the element and opposing substrates; joining the element and opposing substrates; injecting the liquid crystal material into the hole portion; separating the joined element and opposing substrates to form at least the liquid crystal display device having an open portion, a peripheral seal portion and an external lead-out wiring portion.

Another aspect of the present invention is characterized in a method of manufacturing a liquid crystal display device, the method comprising the steps of preparing a first substrate and a second substrate, the first substrate having a pixel portion and a driver portion; forming a peripheral seal portion over one of the first and second substrates, the peripheral seal portion surrounding the pixel portion and the driver portion; forming an injection port for injecting a liquid crystal material; forming at least a first seal stopper portion over one of the first and second substrates; joining the first and second substrates; separating the joined first and second substrates to form at least an empty liquid crystal display device; injecting the liquid crystal material into the empty liquid crystal display device wherein the first seal stopper portion extends from the peripheral seal portion to an end portion of the first and second substrates opposing the peripheral seal portion.

In the method of manufacturing the liquid crystal display device, at least a second seal stopper portion is fog med between the seal stopper portion and the injection port, the second seal stopper portion is formed in parallel with the first seal stopper portion.

In the method of manufacturing the liquid crystal display device, a plurality of seal stopper portions are formed in an opposite side of the injection port.

In the method of manufacturing the liquid crystal display device, a second seal stopper portion is formed in an outside portion of the peripheral seal portion and on an axis of symmetry of the first substrate.

In the method of manufacturing the liquid crystal display device, a damming portion is formed in the injection port.

Another aspect of the present invention is characterized in a method of manufacturing a liquid crystal display device, the method comprising of preparing a first substrate and a second substrate, the first substrate having a pixel portion and a driver portion and having a different size from the second substrate; forming a peripheral seal portion over one of the first and second substrates, the peripheral seal portion surrounding the pixel portion and the driver portion; forming an injection port for injecting a liquid crystal material; forming at least a first seal stopper portion over one of the first and second substrates; joining the first and second substrates; separating the joined first and second substrates to form at least an empty liquid crystal display device; injecting the liquid crystal material into the empty liquid crystal display device, wherein the first seal stopper portion extends from the peripheral seal portion to a corner of the first and second substrates opposing the peripheral seal portion.

Another aspect of the present invention is characterized in a method of manufacturing a liquid crystal display device, the method comprising the steps of preparing a first substrate and a second substrate, the first substrate having a pixel portion and a driver portion; forming a peripheral seal portion over one of the first and second substrates, the peripheral seal portion surrounding the pixel portion and the driver portion; forming an injection port for injecting a liquid crystal material; joining the first and second substrates; separating the joined first and second substrates to form at least an empty liquid crystal display device; injecting the liquid crystal material into the empty liquid crystal display device, wherein the injection port is formed in a corner of the first and second substrates.

In the method of manufacturing the liquid crystal display device, a plurality of seal stopper portions are formed in an outside portion of the injection port.

In the method of manufacturing the liquid crystal display device, a plurality of seal stopper portions are formed in an opposite corner of the injection port.

In the method of manufacturing the liquid crystal display device, a plurality of seal stopper portions are formed in an outside portion of the peripheral seal portion, and the plurality of seal stopper portions are formed in two corners other than the injection port and an opposite corner of injection port.

In the method of manufacturing the liquid crystal display device, a seal stopper portion is formed in an outside portion of the peripheral seal portion and on an axis of symmetry of the first substrate.

In the method of manufacturing the liquid crystal display device, a damming portion is formed in the injection port.

BRIEF DESCRIPTION OF THE DRAWINGS

FIG. 6A is a schematic diagram of device manufacture for injecting a liquid crystal material of Embodiment Mode 3 and Embodiment 19, and FIGS. 6B and 6C are examples of shapes of a dispenser tube;

FIGS. 30A-30D are examples of semiconductor devices which a liquid crystal display device of the present invention is incorporated with according to Embodiment Mode 6.

DETAILED DESCRIPTION OF THE PREFERRED EMBODIMENTS

Specific examples of the present invention are explained below while referring to the figures. The present invention is not limited to these embodiment modes.

Figure 1:
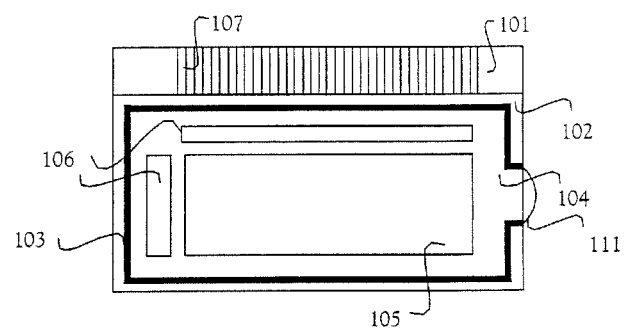
FIG. 1 is a planar diagram of a conventional liquid crystal display device.
Figure 2:
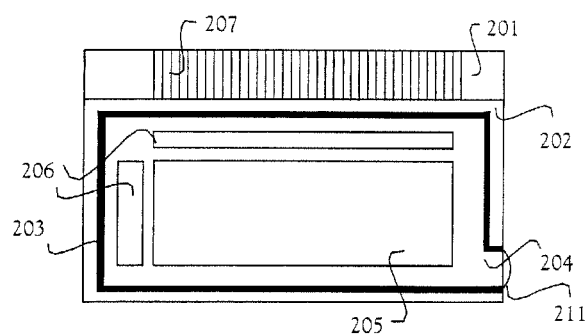
FIG. 2 is a planar diagram of a conventional liquid crystal display device.
Figure 3:
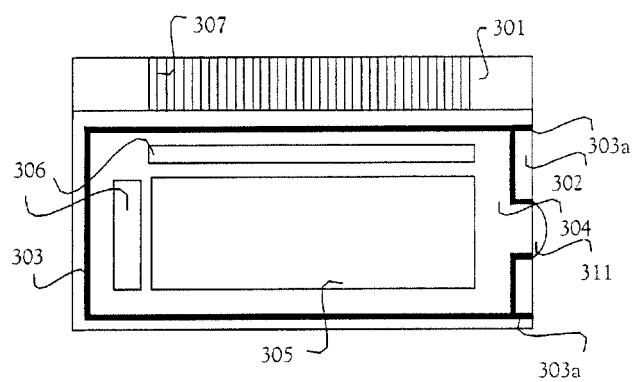
FIG. 3 is a diagram showing a seal pattern of a liquid crystal device of Embodiment Mode 1 and Embodiment 1.
Figure 14:
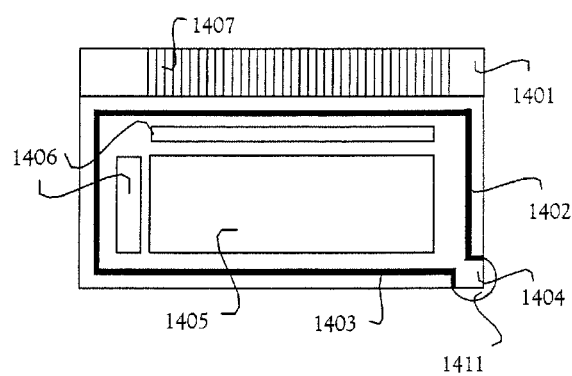
FIG. 14 is a diagram showing a seal pattern of a liquid crystal device of Embodiment Mode 2 and Embodiment 9.

FIG. 3 and FIG. 14 are diagrams showing standard shapes of seal patterns of a liquid crystal display device including a seal stopper portion and a liquid crystal display device having an injection port in a corner of a substrate used in a method of manufacturing a liquid crystal display device relating to Embodiment Mode 1 and Embodiment Mode 2, respectively, of the present invention.

Figure 4:
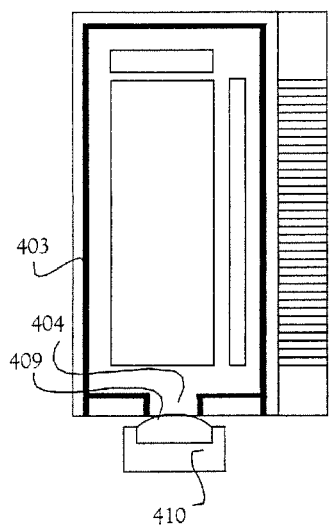
FIG. 4 is a schematic diagram of device manufacture for injecting a liquid crystal material of Embodiment Mode 1.
Figure 15:
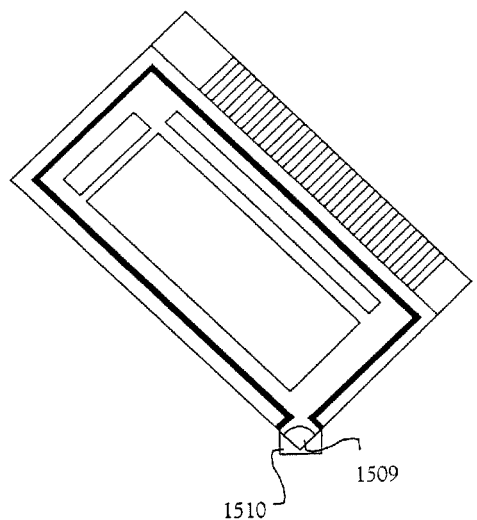
FIG. 15 is a schematic diagram of device manufacture for injecting a liquid crystal material of Embodiment Mode 2.
Figure 16:
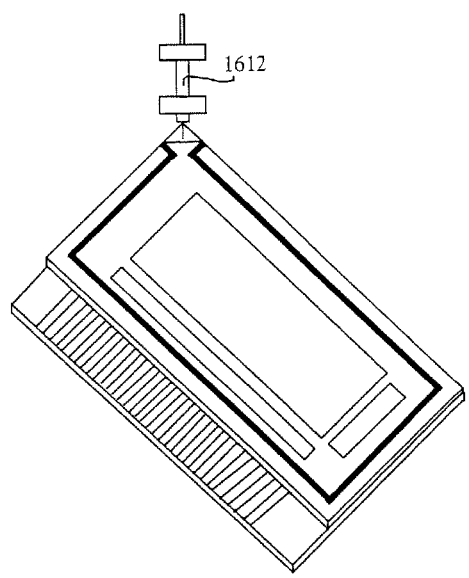
FIG. 16 is a schematic diagram of device manufacture for injecting a liquid crystal material of Embodiment Mode 4.

FIG. 4 and FIG. 15 are diagrams showing a vacuum injection method used in the method of manufacturing the liquid crystal display device including the seal stopper portion and the method of manufacturing the liquid crystal display device having the injection port in the corner of the substrates relating to Embodiment Mode 1 and Embodiment Mode 2, respectively, of the present invention. FIG. 6 and FIG. 16 are diagrams showing a method of drip injection used in the method of manufacturing the liquid crystal display device including the seal stopper portion and the method of manufacturing a liquid crystal display device having the injection port in the corner of the substrates relating to Embodiment Mode 3 and Embodiment Mode 4, respectively, of the present invention. Another example of a process of manufacturing a liquid crystal display device is shown in FIG. 14 in Embodiment Mode 5. In Embodiment Mode 6, semiconductor device in which an active matrix type liquid crystal display device of the present invention is installed.

Figure 24:
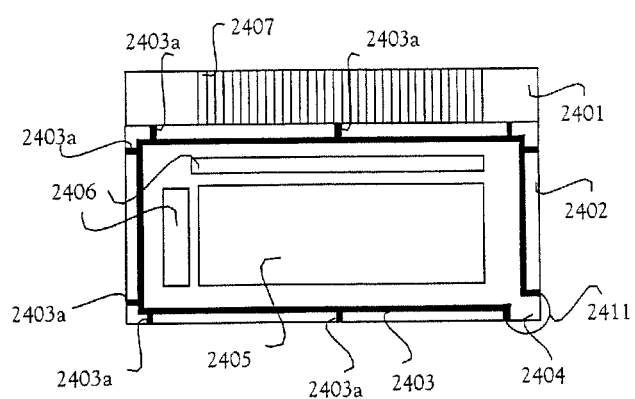
FIG. 24 is a diagram showing a liquid crystal display device of Embodiment 17.

FIG. 24 shows a liquid crystal display device of the present invention. First, an element substrate 2401 and an opposing substrate 2402 are used as upper and lower substrates. A display pixel portion 2405, a peripheral driver circuit 2406, and an external lead-out wiring 2407 are formed in the element substrate 2401. On the other hand, the opposing substrate 2402 is a substrate formed in opposition to the element substrate 2401, and a substrate having components such as an opposing electrode and a color filter (not shown in the figures) formed is shown.

Orientation films SE7792 manufactured by Nissan Chemical Corp. (not shown in the figures) are formed on the element substrate 2401 and the opposing substrate 2402. After applying the orientation films, provisional hardening is performed without delay at 80° C. for 90 seconds, and in addition, a main firing is performed in a clean oven at 200° C. for on the order of 1.5 hours. The film thickness of the orientation film is set so as to become approximately 40 to 80 nm after the main firing. After finishing orientation film printing, a rubbing process is performed as an orienting process on the element substrate 2401 and the opposing substrate 2402, which are oriented so that the liquid crystal molecules possess a certain fixed pre-tilt angle. Refuse generated by the rubbing process and fibers from the rubbing cloth are removed by cleaning (washing).

Figure 31:
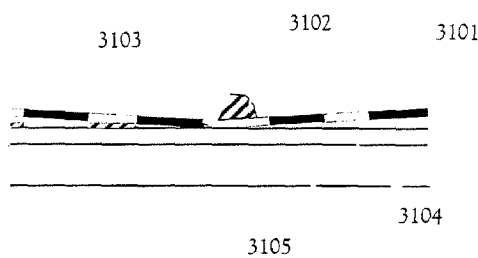
FIG. 31 is a diagram showing screen printing of the present invention.

Next, a sealing material is formed on the opposing substrate 2402 using a screen printing machine. As shown in FIG. 31, a screen printing screen 3101 is used here, and first the screen is attached to a screen frame, and after forming a screen film manufactured from a resin in a lower portion of the screen, manufacturing proceeds by removing necessary portions of the display pixel portion of the screen film by a method such as photo etching. Then, if a sealing material 3102 is placed on the screen printing screen 3101, and a squeegee 3103 is moved in a horizontal direction while applying pressure, then the sealing material passes through portions of the screen in which the screen film doesn't exist, and a seal pattern having a peripheral seal portion 2403 and seal stopper portions 2403a in two corners of the injection port side is formed. The squeegee is a rubber plate having elasticity, and possesses a sealing material pushing out action and a scraping action of the sealing material on the screen. A urethane resin may be used as the squeegee material, and the squeegee angle may always be maintained at an acute angle. Note reference numerals 3104 and 3105 indicate a substrate and a stage, respectively.

The seal width is set so as to be from 1.2 to 1.5 mm after overlapping and thermal pressing. The display pixel portion 2405 and the peripheral driver circuit 2406 are arranged so as to be surrounded by the patterns. An injection port 2404 (open portion width 2 to 4 mm) is formed in a portion of the seal pattern of each device, and it becomes possible to inject the liquid crystal through the injection port 2404. The unnecessary liquid crystal material which wraps around the outside with a conventional seal pattern during injection can be dammed by the seal stopper portions 2403a. After the sealing material is applied to the opposing substrate, the opposing substrate to which the sealing material is applied is fired at 90° C. for on the order of 0.5 hours.

Next, spacers (omitted in the figures) for maintaining a substrate gap are distributed evenly in the element substrate 2401 or the opposing substrate 2402. The element substrate 2401 and the opposing substrate 2402 which have been processed as above are overlapped, and the substrates are joined by applying a pressure of 0.3 to 1.0 kgf/cm$^2$ over the entire substrate surface in a direction perpendicular to the substrate, and at the same time thermally pressing in a clean oven at 160° C. for approximately 2 hours.

After then waiting for the overlapping substrates to cool, an empty liquid crystal display device with dimensions of 50×75 mm and having at least the injection port 2404, the peripheral seal portion 2403, the external lead-out wiring portion 2407, and the seal stopper portion 2403a is completed by a separating process using a scriber and a breaker.

As shown in FIG. 24, when a dripping method is applied as a method of injecting the liquid crystal into the liquid crystal display device in which one of the substrate ends is sectioned and an offset is formed, an excess amount of liquid crystal material adhering to the surface of the substrate can be prevented.

A mechanism for regulating an arbitrary pressure state, such as reduced pressure, atmospheric pressure, or added pressure, is prepared, and a liquid crystal injection apparatus on which a liquid crystal dripping dispenser is arranged is used, and dripping injection of the liquid crystal material is performed. As shown in FIG. 16, the liquid crystal display device is inclined in the liquid crystal injection apparatus, and after the pressure is maintained in a low pressure with the injection port facing upward, a dispenser filled with the liquid crystal material is used, and a necessary amount of the liquid crystal is injected to the injection port under atmospheric pressure or a pressurized atmosphere. The liquid crystal material gradually advances from the liquid crystal injection port side to the opposite side, and the injection process is complete. After the inside of the peripheral seal portion 2403 is confirmed to be filled by the liquid crystal material, both faces of the liquid crystal display device are pressurized, and after 15 minutes, any excess liquid crystal material is wiped up, and an ultraviolet hardening type resin 2411 is applied to the injection port 2404 in the pressurized state, and pressurization is stopped. The sealing resin 2411 thus penetrates. The sealing resin 2411 is hardened by ultraviolet light irradiation (from 4 to 10 mW/cm$^2$ for 120 seconds) in this state, and enclosure of the injection port is performed.

Liquid crystal material adhering to the surfaces and the end surfaces of the substrates is cleaned (washed) by an organic solvent, for example acetone of ethanol. Reorientation of the liquid crystal material is performed afterward in a clean oven at 130° C. for approximately 0.5 hours.

A device (FIG. 24) in which a pair of substrates sandwiches a liquid crystal layer (not shown in the figures) is thus obtained by the above processes. Polarizing plates are then attached to both substrate ends of the device, and a wiring for performing electrical connection to the outside is connected, and the liquid crystal display device is completed. By using this liquid crystal display device, liquid crystal material loss is prevented, and a liquid crystal display device having few gap inconsistencies can be obtained by increasing the degree of symmetry of the seal pattern.

Embodiment Mode 1

Embodiment Mode 1 is explained using FIGS. 3 and 4. First, an element substrate and an opposing substrate are used as upper and lower substrates. A display pixel portion, a peripheral driver circuit, and an external lead-out wiring are formed in the element substrate. On the other hand, the opposing substrate is a substrate formed in opposition to the element substrate, and a substrate having components such as an opposing electrode and a color filter formed is shown.

Orientation films SE7792 manufactured by Nissan Chemical Corp. are formed on the element substrate and the opposing substrate. After applying the orientation films, provisional hardening is performed without delay at 80° C. for 90 seconds, and in addition, a main firing is performed in a clean oven at 200° C. for on the order of 1.5 hours. The film thickness of the orientation film is set so as to become approximately 40 to 80 nm after the main firing. After finishing orientation processing, a rubbing process is performed as an orienting process on the element substrate and the opposing substrate, which are oriented so that the liquid crystal molecules possess a certain fixed pre-tilt angle. Refuse generated by the rubbing process and fibers from the rubbing cloth are removed by cleaning.

Next, a sealing material is formed on the opposing substrate using a screen printing machine. A screen printing is used here, and first the screen is attached to a screen frame, and after forming a screen film manufactured from a resin in a lower portion of the screen, manufacturing proceeds by removing necessary portions of the display pixel portion of the screen film by a method such as photo etching. If a sealing material is then placed on the screen printing screen, and a squeegee is moved in a horizontal direction while applying pressure, the sealing material passes through portions of the screen in which the screen film doesn't exist to be printed in the opposing substrate, and a seal pattern having a peripheral seal portion and seal stopper portions in two corners of the injection port side is farmed.

The seal width is set so as to be from 1.2 to 1.5 mm after overlapping and thermal pressing. The display pixel portion and the peripheral driver circuit are arranged so as to be surrounded by the patterns. An injection port (open portion width 2 to 4 mm) is formed in a portion of the seal pattern of each device, and it becomes possible to inject the liquid crystal material through the injection port. The unnecessary liquid crystal material which wraps around the outside with a conventional seal pattern during injection can be dammed by the seal stopper portions. After the sealing material is applied to the opposing substrate, the opposing substrate to which the sealing material is applied is fired at 90° C. for on the order of 0.5 hours.

Next, spacers (not shown in the in the figures) for maintaining a substrate gap are distributed evenly in the element substrate or the opposing substrate. The element substrate and the opposing substrate which have been processed as above are overlapped, and the substrates are joined by applying a pressure of 0.3 to 1.0 kgf/cm$^2$ over the entire substrate surface in a direction perpendicular to the substrate, and at the same time thermally pressing in a clean oven at 160° C. for approximately 2 hours.

After then waiting for the overlapping substrates to cool, an empty liquid crystal display device with dimensions of 50×75 mm is completed by a separating process using a scriber and a breaker.

In this device, a vacuum injection method is used as a method of sandwiching a liquid crystal layer between the pair of opposing substrates. A liquid crystal display device shown by FIG. 3 is prepared within a vacuum vessel, and after obtaining a vacuum state on the order of from $1.33 \times 10^{-5}$ to $1.33 \times 10^{-7}$ Pa inside the vacuum vessel, an injection port 404 of the liquid crystal display device is immersed within a liquid crystal material heaped upon a liquid crystal dish 410, as shown in FIG. 4.

FIG. 3 shows an element substrate 301, an opposing substrate 302, a display pixel portion 305, a peripheral driver circuit 306, an external lead-out wiring portion 307, a peripheral seal portion 303 so as to surround the display pixel portion 305 and the peripheral driver circuit 306, a seal stopper portion 303a, an injection port 304, and a sealing resin 311.

Next, if the vacuum vessel in the vacuum state is gradually leaked and returned to atmospheric pressure, a liquid crystal material 409 is injected from the injection port 404 of the liquid crystal display device by the pressure difference between the pressure within the liquid crystal display device and atmospheric pressure, and by capillary action on the liquid crystal. The liquid crystal material 409 gradually advances from the liquid crystal injection port side, and the injection process is complete. Three hours are required for this process. After confirming that the inside of a peripheral seal portion 403 is filled with the liquid crystal 409, both surfaces of the liquid crystal display device are pressurized, and excess liquid crystal material is wiped off after 15 minutes. An ultraviolet light hardening type resin is applied to the injection port in the pressurized state, and pressurization is stopped. The sealing resin thus penetrates. The sealing resin is hardened by ultraviolet light irradiation (from 4 to 10 mW/cm$^2$ for 120 seconds) in this state, and enclosure of the injection port is performed.

Liquid crystal material adhering to the surfaces and the end surfaces of the substrates is cleaned by an organic solvent, for example acetone or ethanol. The cleaned surface area of the liquid crystal is approximately 46 mm$^2$. Reorientation of the liquid crystal material is performed afterward in a clean oven at 130° C. for 0.5 hours.

A device (FIG. 3) in which a pair of substrates sandwiches a liquid crystal layer (not shown in the figures) is thus obtained by the above processes. Polarizing plates are then attached to both sides of the device, and a wiring for performing electrical connection to the outside is connected, and the liquid crystal display device is completed.

A liquid crystal display device having few gap inconsistencies can be obtained when using a large panel size substrate with dimensions of 100 mm×85 mm, and when using a small panel size substrate with dimensions of 20 mm×20 mm.

A material having epoxy resin as its main constituent is used as the sealing material in Embodiment Mode 1, but there are no particular limitations on the material provided that it is a sealing resin having ultraviolet harden characteristics or thermal hardening characteristics.

The sealing material is applied to the opposing substrate in Embodiment Mode 1, but the sealing material may also be applied to the element substrate.

In Embodiment Mode 1, the Nissan Chemical Corp. Manufactured orienting film SE7792 is used, but a polyimide or polyamic oxide resin normally used in liquid crystal display device orientation films may also be used.

A screen printing machine is used when applying the sealing material in Embodiment Mode 1, but a patchwork method may also be employed using a dispenser drawing method and in which the sealing material is applied to the peripheral seal portion first; and afterward is added to other portions such as the seal stopper portion and the damming portion.

When using the vacuum injection method, it is also possible to form a plurality of open portions in the seal pattern with the aim of shortening the amount of time until vacuum is reached within the liquid crystal display device and the time for injecting the liquid crystal, but considering reliability, it is preferable to form injection ports in three or fewer locations.

It is possible to use a variety of materials as the liquid crystal material, such as a smectic liquid crystal, a nematic liquid crystal, and a cholesteric liquid crystal.

There are compounds composing the liquid crystal material which are capable of being volatilized when using the vacuum injection method, and for example, when using a known liquid crystal vacuum pressurized injection method, the liquid crystal compounds do not become volatile and liquid crystal injection is possible.

An immersion method is used in Embodiment Mode 1, but a yarn method, in which a non-woven fabric, a glass fiber, or a material such as rayon tied into a braided shape is immersed half-way into the liquid crystal material 409 within the liquid crystal plate 410, the liquid crystal material 409 is absorbed, and is then placed in contact with the injection port 404, may also be used.

It is also possible to apply the seal pattern of the present invention to a passive matrix type liquid crystal display device.

In addition, the present embodiment mode is also capable of being applied to the injection of a liquid crystal under normal pressure into a device in which an exhaust port is formed in an opposing edge of the opposite side of the injection port of the liquid crystal display device.

Embodiment Mode 2

A liquid crystal display device having a seal pattern having an injection port in a corner of a peripheral seal portion and a substrate is completed, as shown by FIG. 14, by processes nearly identical to those of Embodiment Mode 1. FIG. 14 shows an element substrate 1401, an opposing substrate 1402, a display pixel portion 1405, a peripheral driver circuit 1406, an external lead-out wiring portion 1407, a peripheral seal portion 1403 so as to surround the display pixel portion 1405 and the peripheral driver circuit 1406, an injection port 1404, a sealing resin 1411. However, a seal open portion of this device is placed in a corner of the substrates, and therefore the substrate is inclined at 45°, as shown in FIG. 15, when liquid crystal injection is performed by immersion, and the substrate is immersed in a liquid crystal material 1509 in a V-shape liquid crystal dish 1510. Consequently, there is no need to heap the liquid crystal material up by surface tension as in Embodiment Mode 1, and therefore liquid crystal material loss can be prevented in comparison with Embodiment Mode 1. In addition, when performing cleaning by organic solvent after sealing the injection port, the surface area to which the liquid crystal adheres is 4 mm². Compared to Embodiment Mode 1, the liquid crystal adhering surface is reduced considerably, and therefore the use of unnecessary cleaning solvent can be prevented.

It is also possible to apply the present embodiment mode to the injection of a liquid crystal under normal pressure into a device in which an exhaust port is formed in an opposite corner of the liquid crystal display device of any of claims 7 through 11.

Embodiment Mode 3

Figure 5:
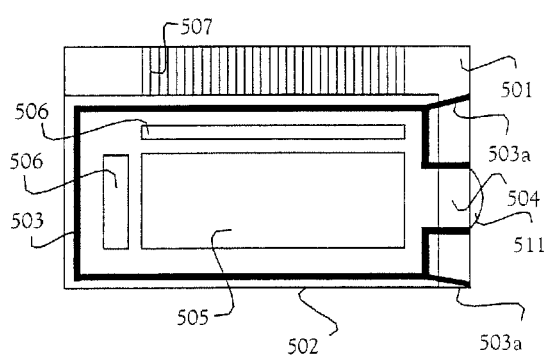
FIG. 5 is a diagram showing a seal pattern of a liquid crystal device of Embodiment Mode 3 and Embodiment 19.

When a dripping injection method is employed to a liquid crystal display device shown in FIG. 5, excess liquid crystal material adhering to a substrate surface can be suppressed in comparison with Embodiment Mode 1. FIG. 5 shows an element substrate 501 and an opposing substrate 502 whose longitudinal and lateral lengths are different from each other, a display pixel portion 505, a peripheral driver circuit 506, an external lead-out wiring portion 507, a peripheral seal portion 503 so as to surround the display pixel portion 505 and the peripheral driver circuit 506, a seal stopper portion 503a, an injection port 504, and a sealing resin 511. A mechanism for regulating an arbitrary pressure state, such as reduced pressure, atmospheric pressure, or added pressure, is prepared, and a liquid crystal injection apparatus on which a liquid crystal dripping dispenser 612 is arranged is used, and dripping injection of the liquid crystal material is performed. As shown in FIG. 6A, the liquid crystal display device of FIG. 5 is inclined in the liquid crystal injection apparatus, and after the pressure is maintained in a low pressure with the injection port facing upward, the dispenser 612 filled with the liquid crystal material is used, and a necessary amount of the liquid crystal is injected to the injection port under atmospheric pressure or a pressurized atmosphere. FIG. 6B shows a trigonal branching tubule and FIG. 6C shows a guide portion.

Embodiment Mode 4

When a liquid crystal dripping method is employed to a liquid crystal display device of FIG. 16 which has an offset portion, excess liquid crystal material adhering to a substrate surface can be suppressed in comparison with Embodiment Mode 3. The liquid crystal dripping method is used in Embodiment Mode 4, and a mechanism for regulating an arbitrary pressure state, such as reduced pressure, atmospheric pressure, or added pressure, is prepared, and a liquid crystal injection apparatus on which a liquid crystal dripping dispenser 1612 is arranged is used to perform dripping injection of the liquid crystal material. As shown in FIG. 16, the liquid crystal display device is inclined in the liquid crystal injection apparatus, and after the pressure is maintained in a low pressure with the injection port facing upward, the dispenser 1612 filled with the liquid crystal material is used, and a necessary amount of the liquid crystal is injected to the injection port under atmospheric pressure or a pressurized atmosphere. It is preferable to form a guide portion in the end of a tube at this point when doing so.

In addition, when performing a separating process to the liquid crystal display devices of FIG. 18, FIG. 20, FIG. 22, and FIG. 24, excess liquid crystal material adhering to the substrate surface can additionally be suppressed for a case of a liquid crystal display device in which an offset (not shown in the figures) is formed near the injection port by cutting two overlapping glass substrates with a step difference.

Figure 18:
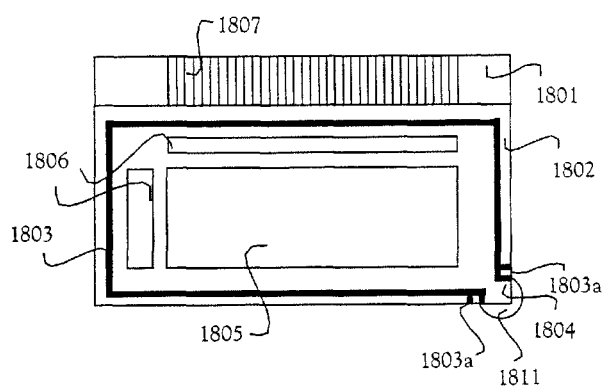
FIG. 18 is a diagram showing a liquid crystal display device of Embodiment 11.

FIG. 18 shows an element substrate 1801, an opposing substrate 1802, a display pixel portion 1805, a peripheral driver circuit 1806, an external lead-out wiring portion 1807, a peripheral seal portion 1803 so as to surround the display pixel portion 1805 and the peripheral driver circuit 1806, a plurality of seal stopper portions 1803a, an injection port 1804, a sealing resin 1811. Note that the distance between the open portion of the seal and the seal stoppers 1803a is set so as to be from 6 mm to 9 mm.

Figure 20:
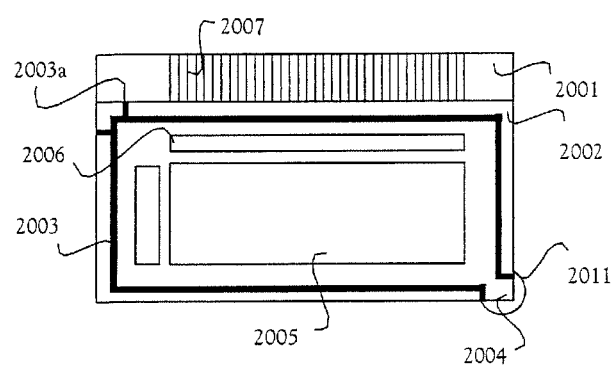
FIG. 20 is a diagram showing a liquid crystal display device of Embodiment 13.

FIG. 20 shows an element substrate 2001, an opposing substrate 2002, a display pixel portion 2005, a peripheral driver circuit 2006, an external lead-out wiring portion 2007, a peripheral seal portion 2003 so as to surround the display pixel portion 2005 and the peripheral driver circuit 2006, an injection port 2004, a plurality of seal stopper portions 2003a arranged in the opposing corner of the injection port 2004, and a sealing resin 2011.

Figure 22:
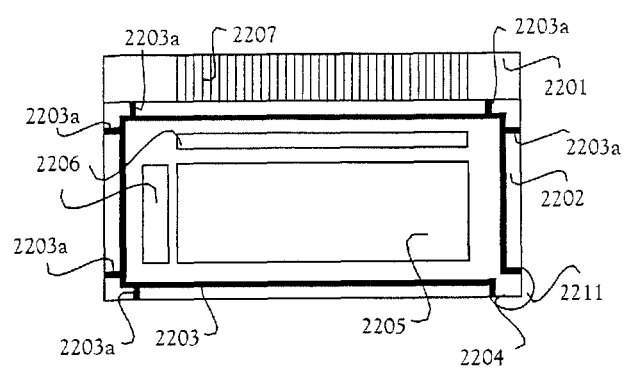
FIG. 22 is a diagram showing a liquid crystal display device of Embodiment 15.

FIG. 22 shows an element substrate 2201, an opposing substrate 2202, a display pixel portion 2205, a peripheral driver circuit 2206, an external lead-out wiring portion 2207, a peripheral seal portion 2203 so as to surround the display pixel portion 2205 and the peripheral driver circuit 2206, an injection port 2204, a plurality of seal stopper portions 2203a formed in the three corners other than the corner having the injection port 2204, and a sealing resin 2211.

FIG. 24 shows an element substrate 2401, an opposing substrate 2402, a display pixel portion 2405, a peripheral driver circuit 2406, an external lead-out wiring portion 2407, a peripheral seal portion 2403 so as to surround the display pixel portion 2405 and the peripheral driver circuit 2406, an injection port 2404, a plurality of seal stopper portions 2403a formed in the three corners other than the corner having the injection port 2404 and on an axis of symmetry of the substrate, and a sealing resin 2411.

Embodiment Mode 5

Another example of the process of manufacturing a liquid crystal display device of FIG. 14 is shown below. This is performed with nearly the same processes as in Embodiment Mode 2 and Embodiment Mode 4, and differing points are shown below.

Figure 27:
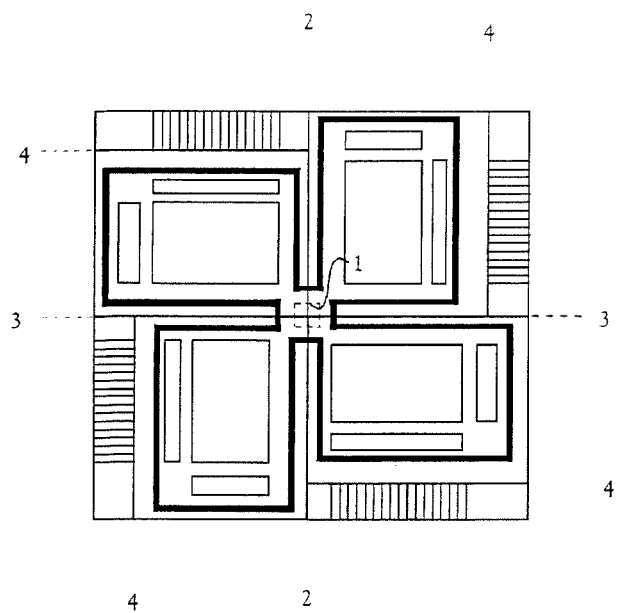
FIG. 27 is a diagram showing lined up substrates before a separating process in Embodiment Mode 5.

As shown in FIG. 27, a 40 mm×40 mm mask in which a hole portion in a center portion (dotted line portion 1) is formed as an offset in an element substrate or an opposing substrate is prepared. A rubbing process is not used here as an orienting process, and the pre-tilt is controlled in accordance with a light orienting method. An orientation film for light orientation is therefore formed on the element substrate and the opposing substrate (omitted in the figures). Linearly polarized ultraviolet light with a wavelength of 260 nm is made incident with a strength of approximately 1 to 2 J/cm² using a mercury lamp. By setting the angle of incidence (the angle from the normal direction) of the ultraviolet rays between 70 and 80°, an orientation regulating power capable of orienting the liquid crystal molecules at a pre-tilt angle of approximately 1° can be expressed.

However, shielding is performed using a photomask so that the ultraviolet rays do not strike the other three portions before separating. A similar process is performed for each of the liquid crystal display devices in the other three portions, and the liquid crystal molecules are oriented.

The element substrate, from which four devices can be taken, and the opposing substrate are overlapped as shown in FIG. 27, thermal pressing is performed, and the substrates are joined. Next, dripping injection of the liquid crystal material is performed within the dotted line portion 1 of FIG. 27, and sealing of an injection port is performed after injection is completed. A liquid crystal display device as shown in FIG. 14 is obtained by a separating process along dotted line portions 2, 3, and 4.

In accordance with using the above manufacturing processes, gap inconsistencies within the device are reduced further than with Embodiment Mode 2, and liquid crystal material loss and the amount of cleaning solvent can both be reduced. Further, in Embodiment Mode 5 an optical orientation method is used as an orientation process, and therefore surface anchoring becomes smaller than for a liquid crystal display device on which a rubbing process has been performed. Consequently, an effect of a reduced driving voltage is obtained.

Not limited to the seal pattern of Embodiment Mode 5, it is possible to apply Embodiment Mode 5 to a process of manufacturing a liquid crystal display device having an injection port, including the liquid crystal display device having the seal stopper portion.

A substrate larger than that of Embodiment Mode 5 is prepared, and a substrate on which TEG, a dummy seal pattern, and a disposable holder for handling are formed may also be used.

A glass substrate is used in Embodiment Mode 5, but a material having low rigidity, such as plastic or a resin film, may also be used. A drop in throughput due to separating defects can be overcome by using this type of material.

Pre-tilt control in accordance with an optical orientation method is used as the orientation process in Embodiment Mode 5, but an electric field orientation method in which the liquid crystal orientation direction is regulated by removing an electrode in the center portion of a pixel and generating an inclined electric field between the upper and lower substrates may also be used. Several domains (multiple domains) are formed within the pixel in accordance with this method, and a wide field of view angle can be realized in accordance with the observation angle characteristics compensated between domains.

The process of manufacturing a liquid crystal display device of Embodiment Mode 5 is not limited to injection of a liquid crystal material, and it is possible to apply the present invention to a technique in which a low viscosity functional material is injected into a narrow gap of several μm.

Embodiment Mode 6

Semiconductor devices into which an active matrix type liquid crystal display device of the present invention, is incorporated are explained using FIGS. 28A-28F, FIGS. 29A-29C, and FIGS. 30A-30D in Embodiment Mode 6.

The following can be given as examples of this type of semiconductor device: a portable information terminal (such as an electronic diary, a mobile computer, and a portable telephone), a video camera, a still camera, a personal computer, and a television. Examples of these are shown in FIGS. 28A to 28F and in FIGS. 29A to 29C.

Figure 28A:
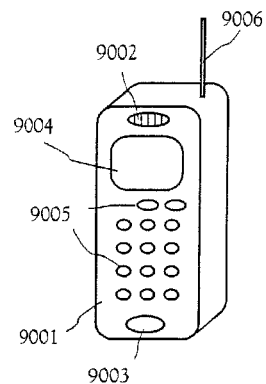
FIGS. 28A-28F are examples of semiconductor devices which a liquid crystal display device of the present invention is incorporated with according to Embodiment Mode 6.

FIG. 28A is a portable telephone, and is composed of a main body 9001, an audio output portion 9002, an audio input portion 9003, a display portion 9004, operation switches 9005, and an antenna 9006. The present invention of this specification can be applied to the display portion 9004 prepared with an active matrix substrate.

Figure 28B:
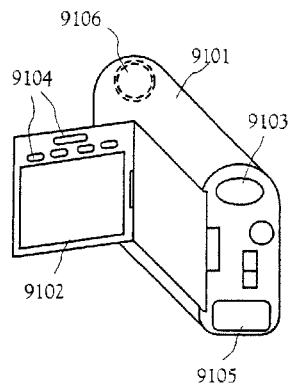

FIG. 28B is a video camera, and is composed of a main body 9101, a display portion 9102, an audio input portion 9103, operation switches 9104, a battery 9105, and an image receiving portion 9106. The present invention of this specification can be applied to the display portion 9102 prepared with an active matrix substrate.

Figure 28C:
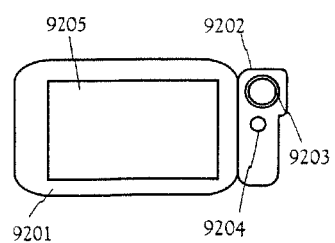

FIG. 28C is a mobile computer or a portable type information terminal, and is composed of a main body 9201, a camera portion 9202, an image receiving portion 9203, operation switches 9204, and a display portion 9205. The present invention of this specification can be applied to the display portion 9205 prepared with an active matrix substrate.

Figure 28D:
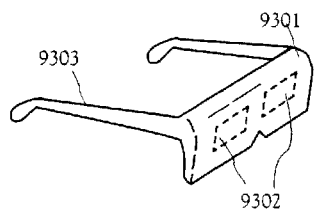

FIG. 28D is a head mounted display, and is composed of a main body 9301, a display portion 9302, and an arm portion 9303. The present invention can be applied to the display portion 9302.

Figure 28E:
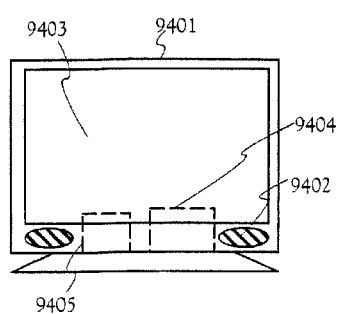

FIG. 28E is a television, and is composed of components such as a main body 9401, speakers 9402, a display portion 9403, a signal receiving device 9404, and an amplifying device 9405. The present invention of this specification can be applied to the display portion 9403.

Figure 28F:
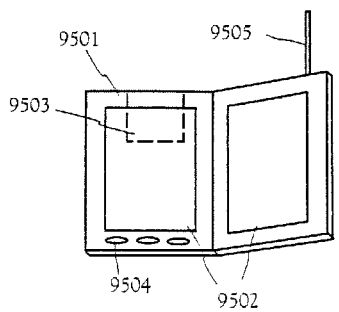

FIG. 28F is a portable book, and is composed of a main body 9501, a display portion 9502, a recording medium 9503, operation switches 9504, and an antenna 9505, and is used for displaying data recorded on a mini-disk (MD) or a DVD, and for displaying data received by the antenna. The display portion 9502 is a direct view liquid crystal display device, and the present invention can be applied to the display portion 9502.

Figure 29A:
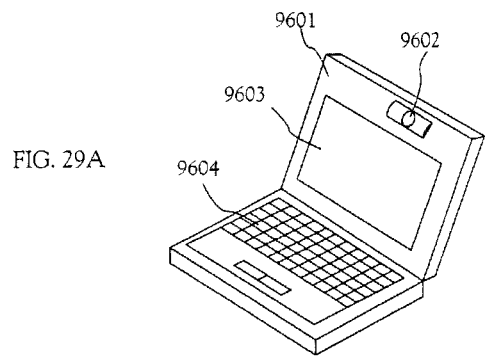
FIGS. 29A-29C are examples of semiconductor devices which a liquid crystal display device of the present invention is incorporated with according to Embodiment Mode 6.

FIG. 29A is a personal computer, and is composed of a main body 9601, an image input portion 9602, a display portion 9603, and a keyboard 9604. The present invention can be applied to the display portion 9603.

Figure 29B:
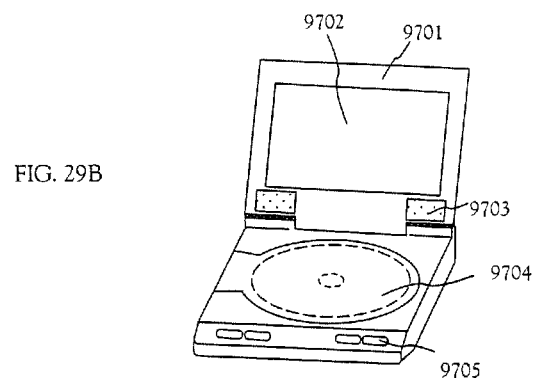

FIG. 29B is a player using a recording medium on which a program is recorded (hereafter referred to as a recording medium), and is composed of a main body 9701, a display portion 9702, a speaker portion 9703, a recording medium 9704, and operation switches 9705. Note that media such as a DVD (digital versatile disc) and a CD can be used as the recording medium for this device, and that the player can be used for music appreciation, film appreciation, games, and the Internet. The present invention can be applied to the display portion 9702.

Figure 29C:
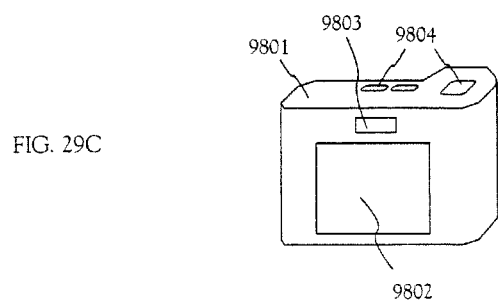

FIG. 29C is a digital camera, and is composed of a main body 9801, a display portion 9802, an eyepiece portion 9803, operation switches 9804, and an image receiving portion (not shown in the figure). The present invention can be applied to the display portion 9802.

FIG. 30A is a front type projector, and is composed of a projecting apparatus 3601 and a screen 3602. The present invention can be applied to a display portion.

FIG. 30B is a rear type projector, and is composed of a main body 3701, a projecting apparatus 3702, a mirror 3703, and a screen 3704. The present invention can be applied to a display portion.

Note that an example of the structure of the projecting apparatuses 3601 and 3702 of FIG. 30A and FIG. 30B is shown in FIG. 30C. The projecting apparatuses 3601 and 3702 are composed of a light source optical system 3801, mirrors 3802 and 3804 to 3806, a dichroic mirror 3803, a prism 3807, a display portion 3808, a phase difference plate 3809, and a projecting optical system 3810. The projecting optical system 3810 is composed of an optical system including a projecting lens. A three plate type example is shown in Embodiment Mode 6, but there are no particular limitations, and a single plate type may also be used, for example. Further, optical systems such as an optical lens, a film having a light polarizing function, a film for regulating the phase, and an IR film may be suitably placed in the optical path shown by the arrow in FIG. 20C by the operator.

Furthermore, FIG. 30D is a diagram showing one example of the light source optical system 3801 in FIG. 30C. In Embodiment Mode 6, the light source optical system 3801 is composed of a reflector 3811, a light source 3812, lens arrays 3813 and 3814, a polarizing transformation element 3815, and a condenser lens 3816. Note that the light source optical system shown in FIG. 30D is one example, and the light source optical system is not limited to the structure shown in the figure. For example, optical systems such as an optical lens, a film having a light polarizing function, a film for regulating the phase, and an IR film may be suitably added by the operator.

The applicable scope of the present invention of this specification is thus extremely wide, and the present invention can be implemented when manufacturing electronic devices of all fields.

Embodiment 1

Embodiment 1 is explained using FIG. 3. An element substrate 301 and an opposing substrate 302 are prepared. A display pixel portion 305, a peripheral-driver circuit 306, and an external lead-out wiring portion 307 are formed in the element substrate 301. A liquid crystal display device of FIG. 3 having a desired seal pattern can be obtained through the processes used in Embodiment Mode 1, namely through: an orientation film application process; an orientation processing process; a process for forming a seal pattern having a peripheral seal portion 303 so as to surround the display pixel portion 305 and the peripheral driver circuit 306, a seal stopper portion 303a, and an injection port 304; a spacer dispersing process; an overlapping process; a separating process; a liquid crystal injection process; a process for sealing by a sealing resin 311; and a process including cleaning and reorientation.

Embodiment 2

Figure 7:
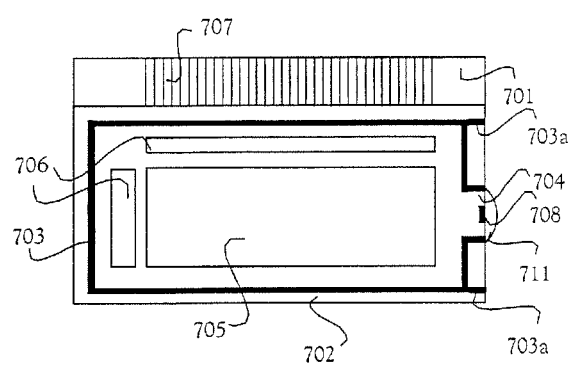
FIG. 7 is a diagram showing a liquid crystal display device of Embodiment 2.

Embodiment 2 is explained using FIG. 7. An element substrate 701 and an opposing substrate 702 are prepared. A display pixel portion 705, a peripheral driver circuit 706, and an external lead-out wiring portion 707 are formed in the element substrate 701. A liquid crystal display device of FIG. 7 having a desired seal pattern can be obtained through the processes used in Embodiment Mode 1, namely through: an orientation film application process; an orientation processing process; a process for forming a seal pattern having a peripheral seal portion 703 so as to surround the display pixel portion 705 and the peripheral driver circuit 706, a seal stopper portion 703a, an injection port 704, and a damming portion 708; a spacer dispersing process; an overlapping process; a separating process; a liquid crystal injection process; a process for sealing by a sealing resin 711; and a process including cleaning and reorientation.

Embodiment 3

Figure 8:
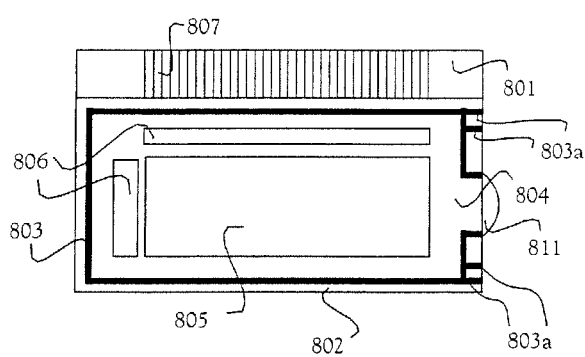
FIG. 8 is a diagram showing a liquid crystal display device of Embodiment 3.

Embodiment 3 is explained using FIG. 8. An element substrate 801 and an opposing substrate 802 are prepared. A display pixel portion 805, a peripheral driver circuit 806, and an external lead-out wiring portion 807 are formed in the element substrate 801. A liquid crystal display device of FIG. 8 having a desired seal pattern can be obtained through the processes used in Embodiment Mode 1, namely through: an orientation film application process; an orientation processing process; a process for forming a seal pattern having a peripheral seal portion 803 so as to surround the display pixel portion 805 and the peripheral driver circuit 806, a plurality of seal stopper portions 803a in two corners of an injection port 804 side, and the injection port 804; a spacer dispersing process; an overlapping process; a separating process; a liquid crystal injection process; a process for sealing by a sealing resin 811; and a process including cleaning and reorientation. The distance between the seal stoppers 803a is set so as to be from 6 mm to 9 mm.

Embodiment 4

Figure 9:
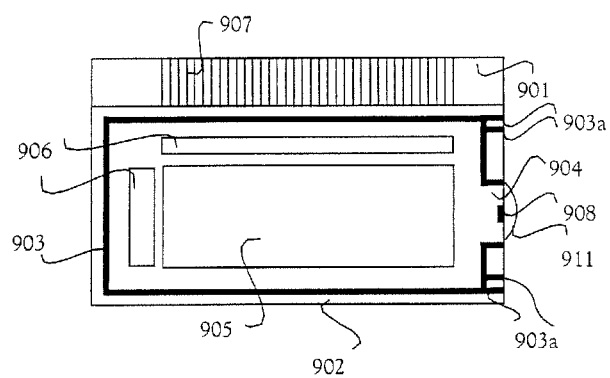
FIG. 9 is a diagram showing a liquid crystal display device of Embodiment 4.

Embodiment 4 is explained using FIG. 9. An element substrate 901 and an opposing substrate 902 are prepared. A display pixel portion 905, a peripheral driver circuit 906, and an external lead-out wiring portion 907 are formed in the element substrate 901. A liquid crystal display device of FIG. 9 having a desired seal pattern can be obtained through the processes used in Embodiment Mode 1, namely through: an orientation film application process; an orientation processing process; a process for forming a seal pattern having a peripheral seal portion 903 so as to surround the display pixel portion 905 and the peripheral driver circuit 906, a plurality of seal stopper portions 903a in two corners of an injection port 904 side, the injection port 904, and a damming portion 908; a spacer dispersing process; an overlapping process; a separating process; a liquid crystal injection process; a process for sealing by a sealing resin 911; and a process including cleaning and reorientation. The distance between the seal stoppers 903a is set so as to be from 6 mm to 9 mm.

Embodiment 5

Figure 10:
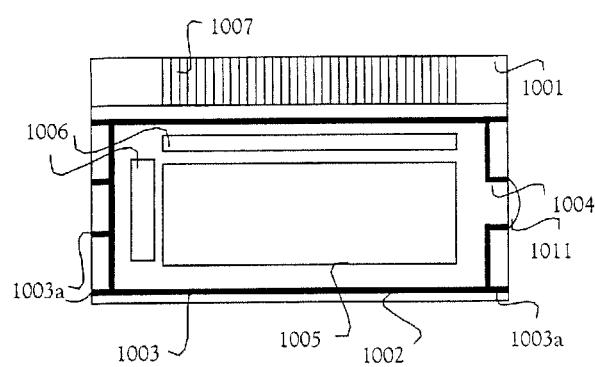
FIG. 10 is a diagram showing a liquid crystal display device of Embodiment 5.

Embodiment 5 is explained using FIG. 10. An element substrate 1001 and an opposing substrate 1002 are prepared. A display pixel portion 1005, a peripheral driver circuit 1006, and an external lead-out wiring portion 1007 are formed in the element substrate 1001. A liquid crystal display device of FIG. 10 having a desired seal pattern can be obtained through the processes used in Embodiment Mode 1, namely through: an orientation film application process; an orientation processing process; a process for forming a seal pattern having a peripheral seal portion 1003 so as to surround the display pixel portion 1005 and the peripheral driver circuit 1006, a plurality of seal stopper portions 1003a in four corners and the opposite side of an open portion, and an injection port 1004; a spacer dispersing process; an overlapping process; a separating process; a liquid crystal injection process; a process for sealing by a sealing resin 1011; and a process including cleaning and reorientation.

Embodiment 6

Figure 11:
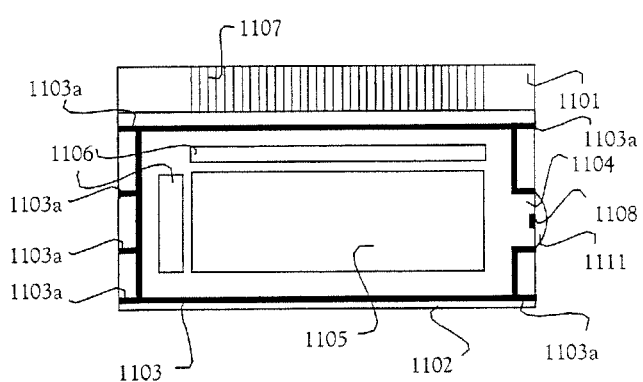
FIG. 11 is a diagram showing a liquid crystal display device of Embodiment 6.

Embodiment 6 is explained using FIG. 11. An element substrate 1101 and an opposing substrate 1102 are prepared. A display pixel portion 1105, a peripheral driver circuit 1106, and an external lead-out wiring portion 1107 are formed in the element substrate 1101. A liquid crystal display device of FIG. 11 having a desired seal pattern can be obtained through the processes used in Embodiment Mode 1, namely through: an orientation film application process; an orientation processing process; a process for forming a seal pattern having a peripheral seal portion 1103 so as to surround the display pixel portion 1105 and the peripheral driver circuit 1106, a plurality of seal stopper portions 1103a in four corners and the opposite side of an open portion, an injection port 1104, and a damming portion 1108; a spacer dispersing process; an overlapping process; a separating process; a liquid crystal injection process; a process for sealing by a sealing resin 1111; and a process including cleaning and reorientation.

Embodiment 7

Figure 12:
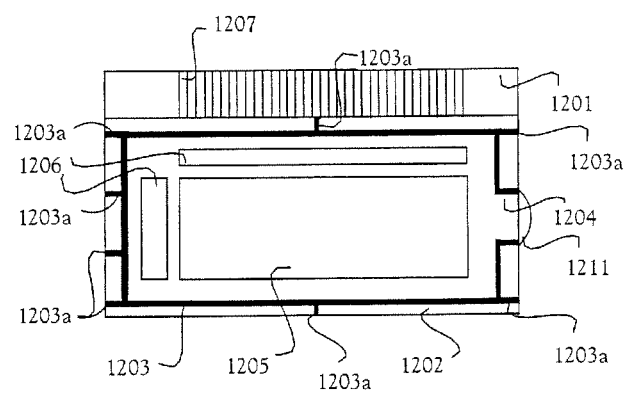
FIG. 12 is a diagram showing a liquid crystal display device of Embodiment 7.

Embodiment 7 is explained using FIG. 12. An element substrate 1201 and an opposing substrate 1202 are prepared. A display pixel portion 1205, a peripheral driver circuit 1206, and an external lead-out wiring portion 1207 are formed in the element substrate 1201. A liquid crystal display device of FIG. 12 having a desired seal pattern can be obtained through the processes used in Embodiment Mode 1, namely through: an orientation film application process; an orientation processing process; a process for forming a seal pattern having a peripheral seal portion 1203 so as to surround the display pixel portion 1205 and the peripheral driver circuit 1206, a plurality of seal stopper portions 1203a arranged on an axis of symmetry of the substrate, in four corners, and in the opposite side of an open portion, and an injection port 1204; a spacer dispersing process; an overlapping process; a separating process; a liquid crystal injection process; a process for sealing by a sealing resin 1211; and a process including cleaning and reorientation.

Embodiment 8

Figure 13:
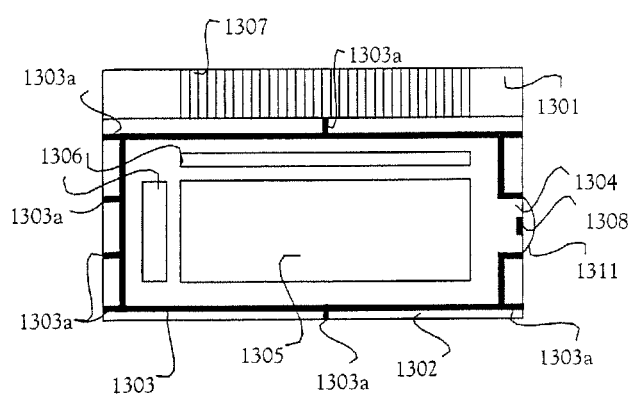
FIG. 13 is a diagram showing a liquid crystal display device of Embodiment 8.

Embodiment 8 is explained using FIG. 13. An element substrate 1301 and an opposing substrate 1302 are prepared. A display pixel portion 1305, a peripheral driver circuit 1306, and an external lead-out wiring portion 1307 are formed in the element substrate 1301. A liquid crystal display device of FIG. 13 having a desired seal pattern can be obtained through the processes used in Embodiment Mode 1, namely through: an orientation film application process; an orientation processing process; a process for forming a seal pattern having a peripheral seal portion 1303 so as to surround the display pixel portion 1305 and the peripheral driver circuit 1306, a plurality of seal stopper portions 1303a arranged in four corners and in the opposite side of an open portion, an injection port 1304, and a damming portion 1308; a spacer dispersing process; an overlapping process; a separating process; a liquid crystal injection process; a process for sealing by a sealing resin 1311; and a process including cleaning and reorientation.

Embodiment 9

Embodiment 9 is explained using FIG. 14. An element substrate 1401 and an opposing substrate 1402 are prepared. A display pixel portion 1405, a peripheral driver circuit 1406, and an external lead-out wiring portion 1407 are formed in the element substrate 1401. A liquid crystal display device of FIG. 14 having a desired seal pattern can be obtained through the processes used in Embodiment Mode 2, namely through: an orientation film application process; an orientation processing process; a process for forming a seal pattern having a peripheral seal portion 1403 so as to surround the display pixel portion 1405 and the peripheral driver circuit 1406 and an injection port 1404; a spacer dispersing process; an overlapping process; a separating process; a liquid crystal injection process; a process for sealing by a sealing resin 1411; and a process including cleaning and reorientation.

Embodiment 10

Figure 17:
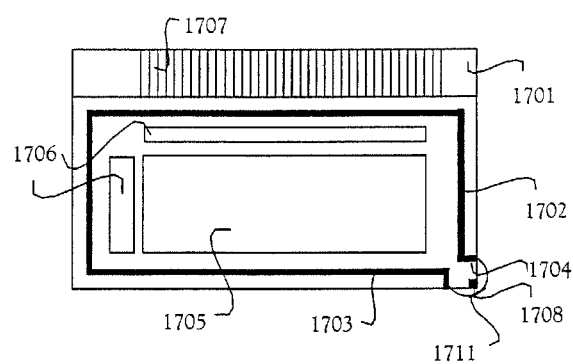
FIG. 17 is a diagram showing a liquid crystal display device of Embodiment 10.

Embodiment 10 is explained using FIG. 17. An element substrate 1701 and an opposing substrate 1702 are prepared. A display pixel portion 1705, a peripheral driver circuit 1706, and an external lead-out wiring portion 1707 are formed in the element substrate 1701. A liquid crystal display device of FIG. 17 having a desired seal pattern can be obtained through the processes used in Embodiment Mode 2, namely through: an orientation film application process; an orientation processing process; a process for forming a seal pattern having a peripheral seal portion 1703 so as to surround the display pixel portion 1705 and the peripheral driver circuit 1706, an injection port 1704, and a damming portion 1708; a spacer dispersing process; an overlapping process; a separating process; a liquid crystal injection process; a process for sealing by a sealing resin 1711; and a process including cleaning and reorientation.

Embodiment 11

Embodiment 11 is explained using FIG. 18. An element substrate 1801 and an opposing substrate 1802 are prepared. A display pixel portion 1805, a peripheral driver circuit 1806, and an external lead-out wiring portion 1807 are formed in the element substrate 1801. A liquid crystal display device of FIG. 18 having a desired seal pattern can be obtained through the processes used in Embodiment Mode 2, namely through: an orientation film application process; an orientation processing process; a process for forming a seal pattern having a peripheral seal portion 1803 so as to surround the display pixel portion 1805 and the peripheral driver circuit 1806, a plurality of seal stopper portions 1803a, and an injection port 1804; a spacer dispersing process; an overlapping process; a separating process; a liquid crystal injection process; a process for sealing by a sealing resin 1811; and a process including cleaning and reorientation. Note that the distance between the open portion of the seal and the seal stoppers 1803a is set so as to be from 6 mm to 9 mm.

Embodiment 12

Figure 19:
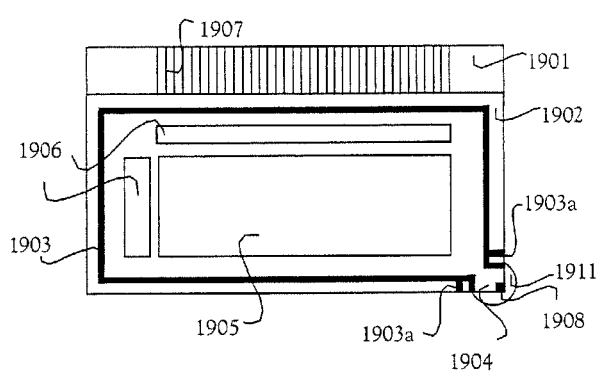
FIG. 19 is a diagram showing a liquid crystal display device of Embodiment 12.

Embodiment 12 is explained using FIG. 19. An element substrate 1901 and an opposing substrate 1902 are prepared. A display pixel portion 1905, a peripheral driver circuit 1906, and an external lead-out wiring portion 1907 are formed in the element substrate 1901. A liquid crystal display device of FIG. 19 having a desired seal pattern can be obtained through the processes used in Embodiment Mode 2, namely through: an orientation film application process; an orientation processing process; a process for forming a seal pattern having a peripheral seal portion 1903 so as to surround the display pixel portion 1905 and the peripheral driver circuit 1906, a plurality of seal stopper portions 1903a, an injection port 1904, and a damming portion 1908; a spacer dispersing process; an overlapping process; a separating process; a liquid crystal injection. process; a process for sealing by a sealing resin 1911; and a process including cleaning and reorientation. Note that the distance between the open portion of the seal and the seal stoppers 1903a is set so as to be from 6 mm to 9 mm.

Embodiment 13

Embodiment 13 is explained using FIG. 20. An element substrate 2001 and an opposing substrate 2002 are prepared. A display pixel portion 2005, a peripheral driver circuit 2006, and an external lead-out wiring portion 2007 are formed in the element substrate 2001. A liquid crystal display device of FIG. 20 having a desired seal pattern can be obtained through the processes used in Embodiment Mode 2, namely through:

an orientation film application process; an orientation processing process; a process for forming a seal pattern having a peripheral seal portion 2003 so as to surround the display pixel portion 2005 and the peripheral driver circuit 2006, a plurality of seal stopper portions 2003a arranged in the opposing corner of an injection port 2004, and the injection port 2004; a spacer dispersing process; an overlapping process; a separating process; a liquid crystal injection process; a process for sealing by a sealing resin 2011; and a process including cleaning and reorientation.

Embodiment 14

Figure 21:
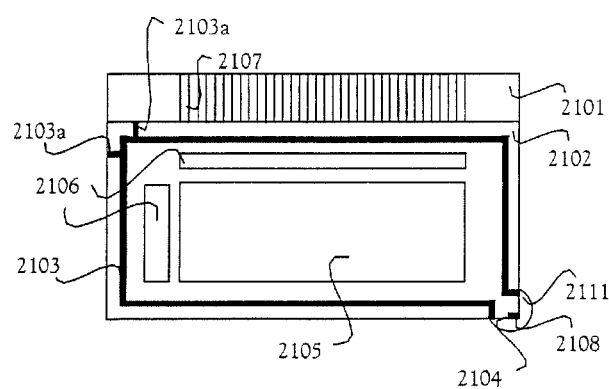
FIG. 21 is a diagram showing a liquid crystal display device of Embodiment 14.

Embodiment 14 is explained using FIG. 21. An element substrate 2101 and an opposing substrate 2102 are prepared. A display pixel portion 2105, a peripheral driver circuit 2106, and an external lead-out wiring portion 2107 are formed in the element substrate 2101. A liquid crystal display device of FIG. 21 having a desired seal pattern can be obtained through the processes used in Embodiment Mode 2, namely through: an orientation film application process; an orientation processing process; a process for forming a seal pattern having a peripheral seal portion 2103 so as to surround the display pixel portion 2105 and the peripheral driver circuit 2106, a plurality of seal stopper portions 2103a arranged in the opposing corner of an injection port 2104, the injection port 2104, and a damming portion 2108; a spacer dispersing process; an overlapping process; a separating process; a liquid crystal injection process; a process for sealing by a sealing resin 2111; and a process including cleaning and reorientation.

Embodiment 15

Embodiment 15 is explained using FIG. 22. An element substrate 2201 and an opposing substrate 2202 are prepared. A display pixel portion 2205, a peripheral driver circuit 2206, and an external lead-out wiring portion 2207 are formed in the element substrate 2201. A liquid crystal display device of FIG. 22 having a desired seal pattern can be obtained through the processes used in Embodiment Mode 2, namely through: an orientation film application process; an orientation processing process; a process for forming a seal pattern having a peripheral seal portion 2203 so as to surround the display pixel portion 2205 and the peripheral driver circuit 2206, a plurality of seal stopper portions 2203a formed in the three corners other than the corner having an injection port 2204, and the injection port 2204; a spacer dispersing process; an overlapping process; a separating process; a liquid crystal injection process; a process for sealing by a sealing resin 2211; and a process including cleaning and reorientation.

Embodiment 16

Figure 23:
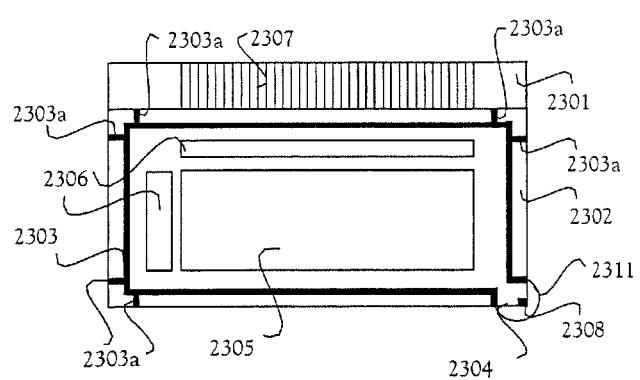
FIG. 23 is a diagram showing a liquid crystal display device of Embodiment 16.

Embodiment 16 is explained using FIG. 23. An element substrate 2301 and an opposing substrate 2302 are prepared. A display pixel portion 2305, a peripheral driver circuit 2306, and an external lead-out wiring portion 2307 are formed in the element substrate 2301. A liquid crystal display device of FIG. 23 having a desired seal pattern can be obtained through the processes used in Embodiment Mode 2, namely through: an orientation film application process; an orientation processing process; a process for forming a seal pattern having a peripheral seal portion 2303 so as to surround the display pixel portion 2305 and the peripheral driver circuit 2306, a plurality of seal stopper portions 2303a formed in the three corners other than the corner having an injection port 2304, the injection port 2304, and a damming portion 2308; a spacer dispersing process; an overlapping process; a separating process; a liquid crystal injection process; a process for sealing by a sealing resin 2311; and a process including cleaning and reorientation.

Embodiment 17

Embodiment 17 is explained using FIG. 24. An element substrate 2401 and an opposing substrate 2402 are prepared. A display pixel portion 2405, a peripheral driver circuit 2406, and an external lead-out wiring portion 2407 are formed in the element substrate 2401. A liquid crystal display device of FIG. 24 having a desired seal pattern can be obtained through the processes used in Embodiment Mode 2, namely through: an orientation film application process; an orientation processing process; a process for forming a seal pattern having a peripheral seal portion 2403 so as to surround the display pixel portion 2405 and the peripheral driver circuit 2406, a plurality of seal stopper portions 2403a formed in the three corners other than the corner having an injection port 2404 and on an axis of symmetry of the substrate, and the injection port 2404; a spacer dispersing process; an overlapping process; a separating process; a liquid crystal injection process; a process for sealing by a sealing resin 2411; and a process including cleaning and reorientation.

Embodiment 18

Figure 25:
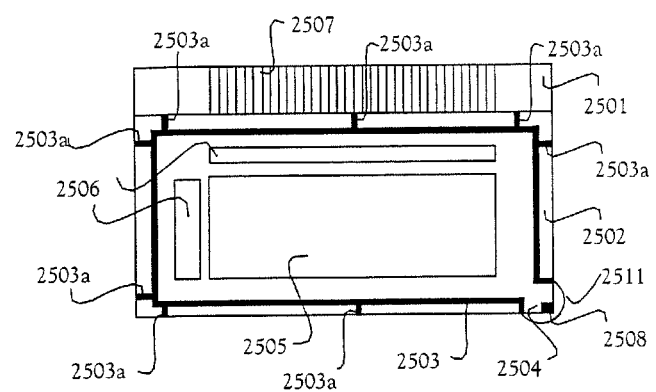
FIG. 25 is a diagram showing a liquid crystal display device of Embodiment 18.
Figure 26:
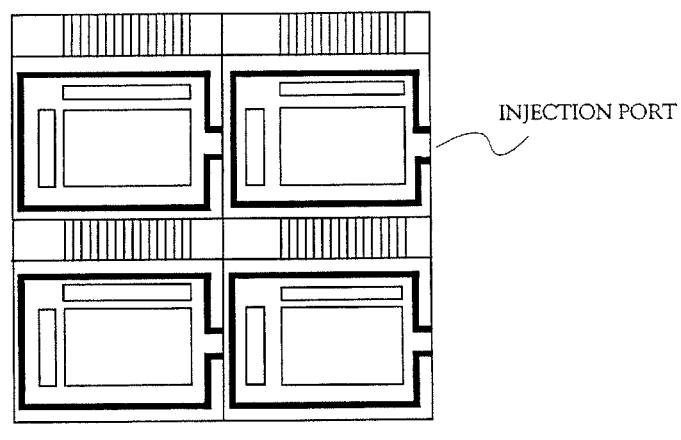
FIG. 26 is a diagram showing lined up substrates before a conventional separating process.

Embodiment 18 is explained using FIG. 25. An element substrate 2501 and an opposing substrate 2502 are prepared. A display pixel portion 2505, a peripheral driver circuit 2506, and an external lead-out wiring portion 2507 are formed in the element substrate 2501. A liquid crystal display device of FIG. 25 having a desired seal pattern can be obtained through the processes used in Embodiment Mode 2, namely through: an orientation film application process; an orientation processing process; a process for forming a seal pattern having a peripheral seal portion 2503 so as to surround the display pixel portion 2505 and the peripheral driver circuit 2506, a plurality of seal stopper portions 2503a formed in the three corners other than the corner having an injection port 2504 and on an axis of symmetry of the substrate, the injection port 2504, and a damming portion 2508; a spacer dispersing process; an overlapping process; a separating process; a liquid crystal injection process; a process for sealing by a sealing resin 2511; and a process including cleaning and reorientation.

Embodiment 19

Embodiment 19 is explained using FIG. 5. An element substrate 501 and an opposing substrate 502 whose longitudinal and lateral lengths are different from each other, are prepared. A display pixel portion 505, a peripheral driver circuit 506, and an external lead-out wiring portion 507 are formed in the element substrate 501. A. liquid crystal display device of FIG. 5 having a desired seal pattern can be obtained through the processes used in Embodiment Mode 1, except for the injection process of Embodiment Mode 1, namely through: an orientation film application process; an orientation processing process; a process for forming a seal pattern having a peripheral seal portion 503 so as to surround the display pixel portion 505 and the peripheral driver circuit 506, and a seal stopper portion 503a; a spacer dispersing process; an overlapping process; a separating process; a liquid crystal dripping injection process using the dispenser 612 of Embodiment Mode 3 as shown in FIG. 6; a process for sealing by a sealing resin 511; and a process including cleaning and reorientation.

In addition, when performing a separating process to the liquid crystal display devices of FIG. 8, FIG. 10, and FIG. 12, excess liquid crystal material adhering to the substrate surface can be suppressed for a case of a liquid crystal display device in which an offset portion (not shown in the figures) is formed near the injection port by cutting two overlapping glass substrates with a step difference.

Note that, as shown in FIG. 5, a seal stopper portion 503a is preferably an improved seal pattern in which the coiner of the substrates and the corner of the peripheral seal portion 503 are connected.

In addition, other than a tubule in the tip of the dispenser 612, dripping of the liquid crystal material can be performed at the same time along the injection port by a trigonal branching tubule as shown in FIG. 6B or by forming a guide portion as shown in FIG. 6C, so that stable liquid crystal injection at all times becomes possible. The amount of processing time for a large size liquid crystal display device or a liquid crystal display device having a narrow liquid crystal gap can be shortened.

In accordance with the present invention, wraparound of a liquid crystal material can be prevented by forming a seal stopper portion outside a conventional seal pattern, and further, by forming a plurality of seal stopper portions, wraparound of the liquid crystal material is very strongly prevented. Therefore, the present invention can reduce the amount of liquid crystal material used and can reduce cost, to thereby overcome problems relating to production. Further, by also forming an open portion (an injection portion) of the seal in a corner of a substrate, not only the amount of liquid crystal materia used, but also the use of unnecessary cleaning solvent can be prevented. In addition, by increasing the degree of symmetry of the seal pattern or by forming a damming portion near the an injection port, gap inconsistencies within the liquid crystal display device can be reduced, and uniformity can be increased.

By using the seal stopper portion within the liquid crystal display device, separating defects and seal peeling are prevented form occurring during the manufacturing process and the ratio of good parts can be increased. Further, a portion of an end surface is joined by the seal material, and therefore a sturdy liquid crystal display device can be provided.

Furthermore, when using a liquid crystal dripping method for a device in which an offset is formed near the injection port in the liquid crystal display device of the present invention, liquid crystal material loss can be reduced.

In addition, with a conventional process liquid crystal injection is performed after a separating process, but provided that the method of manufacturing the liquid crystal display device of the present invention in which liquid crystal injection is performed prior to the separating process, the amount of liquid crystal material used can be reduced, gap inconsistencies within the liquid crystal display device can be reduced, and it becomes possible to increase uniformity. Additionally, it is possible to make a rubbing process unnecessary, and therefore it becomes possible to prevent problems such as transistor damage due to static electricity and the generation of rubbing refuse, and this is effective in increasing yield and lowering costs.

What is claimed is:

1. A method of manufacturing a liquid crystal display device, the method comprising:
    forming an orientation film over each of an element substrate and an opposing substrate;
    performing an orientation process to each of the element substrate and the opposing substrate;
    forming a seal pattern from a sealing material on one of the element substrate and the opposing substrate, the seal pattern comprising a first portion and second portions, the second portions of the seal pattern extending up to edges of the one of the element substrate and the opposing substrate so that an injection port is formed at a corner of the one of the element substrate and the opposing substrate;
    joining the element substrate and the opposing substrate;
    separating the joined element substrate and opposing substrate to form at least an empty liquid crystal display device; and
    injecting a liquid crystal material into the empty liquid crystal display device through an immersion method, the injecting including employing a V-shape liquid crystal dish in contact with the injection port.

2. A method of manufacturing a liquid crystal display device according to claim 1, wherein the liquid crystal material is a nematic liquid crystal.

3. A method of manufacturing a liquid crystal display device, the method comprising:
    forming a seal pattern over one of a first substrate and a second substrate, the seal pattern comprising a first portion and second portions, wherein the first portion is adjacent to four edges of one of the first substrate and the second substrate and the second portions extends up to two of the four edges so that an injection port is formed at a corner of the one of the first substrate and the second substrate;
    pasting the first substrate and the second substrate so that the seal pattern is interposed between the first substrate and the second substrate; and
    injecting a liquid crystal on a liquid crystal dish having a V-shape cross-section through the injection port,
    wherein a first surface and a second surface of the liquid crystal dish are in contact with the two edges.

4. A method of manufacturing a liquid crystal display device according to claim 1,
    wherein the liquid crystal dish comprises a bottom surface, and
    wherein an angle between the first surface and the bottom surface is 45°.

5. A method of manufacturing a liquid crystal display device according to claim 1, wherein at least one of the element substrate and the opposing substrate is a glass substrate.

6. A method of manufacturing a liquid crystal display device according to claim 1, wherein the orientation film comprises a polyimide.

7. A method of manufacturing a liquid crystal display device according to claim 3, wherein the liquid crystal is a nematic liquid crystal.

8. A method of manufacturing a liquid crystal display device according to claim 3,
    wherein the liquid crystal dish comprises a bottom surface, and
    wherein an angle between the first surface and the bottom surface is 45°.

9. A method of manufacturing a liquid crystal display device according to claim 3, wherein at least one of the first substrate and the second substrate is a glass substrate.

10. A method of manufacturing a liquid crystal display device according to claim 1, wherein the orientation film comprises a polyimide.

11. A method of manufacturing a liquid crystal display device, the method comprising:
- forming an orientation film over each of an element substrate and an opposing substrate;
- performing an orientation process with a light orienting method to each of the element substrate and the opposing substrate;
- forming a seal pattern from a sealing material on one of the element substrate and the opposing substrate, the seal pattern comprising a first portion and second portions, the second portions of the seal pattern extending up to edges of the one of the element substrate and the opposing substrate so that an injection port is formed at a corner of the one of the element substrate and the opposing substrate;
- joining the element substrate and the opposing substrate;
- separating the joined element substrate and opposing substrate to form at least an empty liquid crystal display device; and
- injecting a liquid crystal material into the empty liquid crystal display device through an immersion method, the injecting including employing a V-shape liquid crystal dish in contact with the injection port.

12. A method of manufacturing a liquid crystal display device according to claim 11, wherein the liquid crystal material is a nematic liquid crystal.

13. A method of manufacturing a liquid crystal display device according to claim 11,
wherein the liquid crystal dish comprises a bottom surface, and
wherein an angle between the first surface and the bottom surface is 45°.

14. A method of manufacturing a liquid crystal display device according to claim 11, wherein at least one of the element substrate and the opposing substrate is a glass substrate.

15. A method of manufacturing a liquid crystal display device according to claim 11, wherein the orientation film comprises a polyimide.

* * * * *

UNITED STATES PATENT AND TRADEMARK OFFICE
CERTIFICATE OF CORRECTION

PATENT NO. : 8,648,995 B2  Page 1 of 1
APPLICATION NO. : 12/721771
DATED : February 11, 2014
INVENTOR(S) : Hideki Katsura It is certified that error appears in the above-identified patent and that said Letters Patent is hereby corrected as shown below:

In the Specification

Column 6, line 4, replace "fog med" with --formed--;

Column 10, line 54, replace "farmed" with --formed--;

Column 12, line 14, after "first" replace ";" with --,--;

Column 22, line 57, after "A" delete ".";

Column 23, line 12, replace "coiner" with --corner--.

Signed and Sealed this
Sixteenth Day of September, 2014

Michelle K. Lee
*Deputy Director of the United States Patent and Trademark Office*